United States Patent
Tanaka et al.

(10) Patent No.: US 11,339,274 B2
(45) Date of Patent: May 24, 2022

(54) RESIN COMPOSITION AND RESIN MOLDED ARTICLE

(71) Applicant: Eastman Chemical Company, Kingsport, TN (US)

(72) Inventors: Ryo Tanaka, Minamiashigara (JP); Kana Miyazaki, Minamiashigara (JP); Masahiro Moriyama, Minamiashigara (JP); Kenji Yao, Minamiashigara (JP)

(73) Assignee: Eastman Chemical Company, Kingsport, TN (US)

( * ) Notice: Subject to any disclaimer, the term of this patent is extended or adjusted under 35 U.S.C. 154(b) by 362 days.

(21) Appl. No.: 16/779,937

(22) Filed: Feb. 3, 2020

(65) Prior Publication Data

US 2020/0172710 A1    Jun. 4, 2020

Related U.S. Application Data

(63) Continuation of application No. PCT/JP2018/005133, filed on Feb. 14, 2018.

(30) Foreign Application Priority Data

Sep. 26, 2017  (JP) .............................. JP2017-184698

(51) Int. Cl.
    *C08L 1/14*    (2006.01)

(52) U.S. Cl.
    CPC ............. *C08L 1/14* (2013.01); *C08L 2201/10* (2013.01); *C08L 2205/035* (2013.01); *C08L 2207/53* (2013.01)

(58) Field of Classification Search
    CPC ........................................................ C08L 1/14
    See application file for complete search history.

(56) References Cited

U.S. PATENT DOCUMENTS

2010/0233389 A1*  9/2010  Suzuki ............. G02F 1/133528
                                                       428/323

\* cited by examiner

*Primary Examiner* — Arrie L Reuther
(74) *Attorney, Agent, or Firm* — C. Stuart Everett

(57) ABSTRACT

A resin composition includes a cellulose ester compound (A), a poly(meth)acrylate compound (B) containing 50% by weight or more of a constituting unit derived from a (meth) acrylic acid alkyl ester, a polyester resin (C), and at least one polymer (D) selected from a polymer with a core shell structure having a core layer and a shell layer containing a polymer of a (meth)acrylic acid alkyl ester on a surface of the core layer, and an olefin polymer which is a polymer of an α-olefin and a (meth)acrylic acid alkyl ester and contains 60% by weight or more of a constituting unit derived from the α-olefin.

19 Claims, No Drawings

RESIN COMPOSITION AND RESIN MOLDED ARTICLE

CROSS-REFERENCE TO RELATED APPLICATIONS

This is a continuation of International Application No. PCT/JP2018/005133 filed on Feb. 14, 2018, and claims priority under 35 USC 119 from Japanese Patent Application No. 2017-184698 filed on Sep. 26, 2017.

BACKGROUND

Technical Field

The present invention relates to a resin composition and a resin molded article.

Related Art

Hitherto, various resin compositions have been provided and are used for various applications. Resin compositions are used particularly in various components and housings of home appliances and automobiles and the like. Further, thermoplastic resins are also used in components, for example, housings of business apparatuses and electric and electronic apparatuses.

In recent years, plant-derived resins have been used, and there is a cellulose ester compound as one of the plant-derived resins which have been conventionally known.

For example, in Patent Document 1, a resin composition comprising blending (A) a polylactic acid resin, (B) a methacrylic resin, and (C) a thermoplastic resin having a refractive index in a range of 1.45 to 1.50, wherein a weight ratio of the polylactic acid resin (A) to the methacrylic resin (B) is 70/30 to 10/90, a weight ratio of a total amount of the polylactic acid resin (A) and the methacrylic resin (B) to the thermoplastic resin having a refractive index in a range of 1.45 to 1.50 (C) is 99/1 to 1/99, and the methacrylic resin (B) has a weight average molecular weight of 50,000 to 450,000 and satisfies at least one of condition (1) that a glass transition temperature is 110° C. or more and condition (2) that a syndiotacticity is 40% or more is disclosed. Further, in Patent Document 1, as the thermoplastic resin having a refractive index in a range of 1.45 to 1.50 (C), a cellulose resin (cellulose ester compound) is disclosed.

Further, in Patent Document 2, a thermoplastic resin composition containing polylactic acid (A), at least one cellulose derivative (B) selected from cellulose (acetate) propionate and cellulose (acetate) butyrate, and a (meth) acrylate polymer (C) is disclosed.

Patent Document 1: Japanese Patent No. 5298496
Patent Document 2: JP-A-2010-037485

SUMMARY

By the way, as the resin molded article based on a resin composition containing a cellulose ester compound (A), a resin molded article based on a resin composition containing a cellulose ester compound (A), a poly(meth)acrylate compound (B) and a polyester resin (C) is known. Improvement in tensile strain at break is required for the resin molded article.

Aspects of non-limiting embodiments of the present disclosure relate to a resin composition which is capable of obtaining a resin molded article excellent in the tensile strain at break in comparison with a resin composition containing only a cellulose ester compound (A), a poly(meth)acrylate compound (B) containing 50% by weight or more of a constituting unit derived from a (meth)acrylic acid alkyl ester and a polyester resin (C).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin composition containing a cellulose ester compound (A), a poly(meth)acrylate compound (B) containing 50% by weight or more of a constituting unit derived from a (meth)acrylic acid alkyl ester, a polyester resin (C), and at least one polymer (D) selected from a polymer with a core shell structure having a core layer and a shell layer containing a polymer of a (meth)acrylic acid alkyl ester on a surface of the core layer, and an olefin polymer which is a polymer of an α-olefin and a (meth)acrylic acid alkyl ester and contains 60% by weight or more of a constituting unit derived from the α-olefin.

DETAILED DESCRIPTION

Hereinafter, an exemplary embodiment which is an example of the invention will be described.

In the specification, in the case wherein a substance corresponding to the each component is present in plurality in the object, an amount of each component in the object means a total content rate or a total content of the plural substances present in the object unless otherwise specified.

Further, the description of "polymer of A" is an expression including a copolymer of A and a monomer other than A in addition to a homopolymer of only A. Similarly, the description of "copolymer of A and B" is an expression including a copolymer of A, B and monomer(s) other than A and B in addition to a copolymer of only A and B (hereinafter, also referred to as "single copolymer" for convenience).

Further, the cellulose ester compound (A), poly(meth) acrylate compound (B), polyester resin (C) and polymer (D) are also referred to as component (A), component (B), component (C) and component (D), respectively.

<Resin Composition>

The resin composition according to the exemplary embodiment contains a cellulose ester compound (A), a poly(meth)acrylate compound (B) containing 50% by weight or more of a constituting unit derived from a (meth) acrylic acid alkyl ester, a polyester resin (C), and at least one polymer (D) selected from a polymer with a core shell structure having a core layer and a shell layer containing a polymer of a (meth)acrylic acid alkyl ester on a surface of the core layer, and an olefin polymer which is a polymer of an α-olefin and a (meth)acrylic acid alkyl ester and contains 60% by weight or more of a constituting unit derived from the α-olefin. The resin composition according to the exemplary embodiment may contain other components.

Hitherto, since the cellulose ester compound (A) (in particular, a cellulose acylate in which a part of hydroxy groups is substituted with an acyl group) is based on non-edible resources and is a primary derivative not requiring chemical polymerization, it is a resin material friendly to the environment. Further, due to the strong hydrogen bond property it has a high elastic modulus as the resin material. Moreover, it has the feature of high transparency because of the alicyclic structure.

By the way, as the resin molded article based on a resin composition containing a cellulose ester compound (A), a resin molded article based on a resin composition containing a cellulose ester compound (A), a poly(meth)acrylate compound (B) and a polyester resin (C) is known. Improvement in tensile strain at break is required for the resin molded article.

On the contrary, the resin composition according to the exemplary embodiment provides a resin molded article excellent in the tensile strain at break by taking the configuration described above in comparison with a resin composition containing only a cellulose ester compound (A), a poly(meth)acrylate compound (B) containing 50% by weight or more of a constituting unit derived from a (meth) acrylic acid alkyl ester and a polyester resin (C). The reason for this is presumed to be as follows.

The component (D) according to the exemplary embodiment has elasticity. Therefore, it is conceivable that if the component (D) is dispersed all over the resin, the tensile strain at break of the resin molded article obtained may be increased. However, in a kneaded product of a resin composition containing plural kinds of resins, due to a difference in compatibility of the respective resins a plurality of resin phases are easy to be formed, and since affinity to the component (D) is different in the respective resin phases, it is difficult to disperse the component (D) in the nearly uniform state all over the resin. For example, when the component (D) is added to a resin composition mainly containing the cellulose ester compound (A) and the poly (meth)acrylate compound (B) containing 50% by weight or more of a constituting unit derived from a (meth)acrylic acid alkyl ester, since the affinity of the component (D) is different to a resin phase of the component (A) (hereinafter, also referred to as "(A) phase") and a resin phase of the component (B) (hereinafter, also referred to as "(B) phase") both formed in the kneaded product of the resin composition, the component (D) is apt to be localized in any of the (A) phase and the (B) phase so that the component (D) is hard to spread all over the resin. Further, similarly, when the component (D) is added to a resin composition mainly containing the cellulose ester compound (A) and the polyester resin (C), the component (D) is hard to be dispersed all over the resin region and is apt to be localized in any one of the (A) phase and a phase of the component (C) (hereinafter, also referred to as "(C) phase").

Here, when the component (D) according to the exemplary embodiment is present in a resin composition containing the cellulose ester compound (A), the poly(meth)acrylate compound (B) containing 50% by weight or more of a constituting unit derived from a (meth)acrylic acid alkyl ester and the polyester resin (C), the component (D) is dispersed in both the resin phase of the component (A) and the resin phase of the component (B) and the component (C) both formed in the kneaded product of the resin composition in the nearly uniform state. The reason for this is not certain, but it is presumed that the difference in the affinity between the component (D) and the respective resin phases formed is small. The component (D) is hard to be unevenly distributed and the component (D) spreads in the respective resin phase in the nearly uniform state so that the elasticity which the component (D) has maybe imparted all over the resin.

Further, the resin composition according to the exemplary embodiment provides a resin molded article not only excellent in the tensile strain at break, but also suppressing the decrease in transparency. The reason for this is not certain, but is presumed to be as follows.

Although each of the component (B) and the component (C) has high compatibility with the component (A), they are not completely compatibilized when they are mixed. Thus, in the case wherein the component (A) and the component (B) are mixed, the (A) phase and the (B) phase are formed. Similarly, in the case wherein the component (A) and the component (C) are mixed, the (A) phase and the (C) phase are formed. Therefore, due to difference in refractive index of each component, the respective mixtures (in other words, the resin compositions) have a tendency of decreasing the transparency.

On the other hand, the refractive index of each component decreases in the order of the component (C), the component (A) and the component (B). In other words, the refractive index of the component (C) is higher than that of the component (A) and the refractive index of the component (B) is lower than that of the component (A). In addition to the above, since the compatibility between the component (B) and the component (C) is higher than the compatibility of the component (A), when the component (A), the component (B) and the component (C) are mixed, the (A) phase and a phase (hereinafter, also referred to as "(B+C) phase") in which the component (B) and the component (C) are compatibilized are formed. Thus, because of the formation of the (B+C) phase by the component (B) and the component (C) wherein the difference in refractive index therebetween is large, the refractive index of the (B+C) phase gets close to the refractive index of the phase (A) (in other words, the component (A)). As a result, the decrease in transparency of the mixture of the component (A), component (B) and the component (C) (in other words, the resin composition) is suppressed.

In addition, even when the component (D) is blended into the three-component system of the component (A), the component (B) and the component (C), the decrease in transparency is suppressed. The reason for this is that first, when the component (D) is blended, the component (D) is dispersed in the respective phases of the (A) phase and the (B+C) phase in the nearly uniform state, as described above. Additionally, the refractive index of the component (D) is close to those of the both phases of the (A) phase and the (B+C) phase. Therefore, it is assumed that even when the component (D) is blended, the decrease in transparency is suppressed.

From the above, it is presumed that the resin composition according to the exemplary embodiment provides a resin molded article excellent in the tensile strain at break, and further, it is presumed that the resin composition according to the exemplary embodiment provides a resin molded article excellent in the tensile strain at break while suppressing the decrease in transparency.

Hereinafter, the components of the resin composition according to the exemplary embodiment will be described in detail.

[Cellulose Ester Compound (A): Component (A)]

The cellulose ester compound (A) is, for example, a resin of a cellulose derivative (cellulose acylate) in which at least a part of hydroxy groups in cellulose is substituted with an acyl group (acylation). Specifically, the cellulose ester compound (A) is, for example, a cellulose derivative represented by formula (CE).

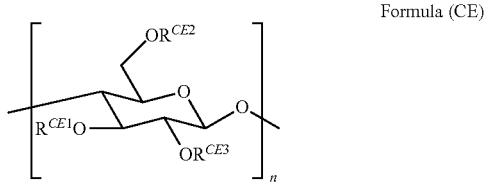

Formula (CE)

In formula (CE), each of $R^{CE1}$, $R^{CE2}$ and $R^{CE3}$ independently represents a hydrogen atom or an acyl group. n represents an integer of 2 or more, provided that at least a part of n $R^{CE1}$s, n $R^{CE2}$s and n $R^{CE3}$s represents an acyl group.

The acyl group represented by each of $R^{CE1}$, $R^{CE2}$ and $R^{CE3}$ is preferably an acyl group having 1 or more and 6 or less carbon atoms.

In formula (CE), a range of n is not particularly limited, and is preferably 200 or more and 1,000 or less, and more preferably 500 or more and 1,000 or less.

When each of $R^{CE1}$, $R^{CE2}$ and $R^{CE3}$ independently represents an acyl group in formula (CE), it indicates that at least a part of hydroxy groups of the cellulose derivative represented by formula (CE) is acylated.

In other words, n $R^{CE1}$s in the molecule of the cellulose derivative represented by formula (CE) may be all the same, partially same or different from each other. Similarly, n $R^{CE2}$s and n $R^{CE3}$s may also be all the same, partially same or different from each other, respectively.

Here, the cellulose ester compound (A) preferably has an acyl group having 1 or more and 6 or less carbon atoms as the acyl group. Such a cellulose ester compound (A) easily provides a resin molded article excellent in the tensile strain at break while suppressing the decrease in transparency in comparison with the case of having an acyl group having 7 or more carbon atoms.

The acyl group is represented by a structure of "—CO—$R^{AC}$" wherein $R^{AC}$ represents a hydrogen atom or a hydrocarbon group (more preferably, a hydrocarbon group having 1 or more and 5 or less carbon atoms).

The hydrocarbon group represented by $R^{AC}$ may have any of a straight-chain, branched or cyclic form, and more preferably has a straight-chain form.

The hydrocarbon group represented by $R^{AC}$ may be a saturated hydrocarbon group or an unsaturated hydrocarbon group, and is more preferably a saturated hydrocarbon group.

The hydrocarbon group represented by $R^{AC}$ may contain an atom (for example, oxygen or nitrogen) other than carbon and hydrogen, and is more preferably a hydrocarbon group composed of only carbon and hydrogen.

The acyl group includes, for example, a formyl group, an acetyl group, a propionyl group, a butyryl group (butanoyl group), a propenoyl group and a hexanoyl group.

Among these, as the acyl group, an acyl group having 2 or more and 4 or less carbon atoms is preferred, and an acyl group having 2 or more and 3 or less carbon atoms is more preferred from the standpoint of suppressing the decrease in transparency and increasing the tensile strain at break of the resin molded article obtained as well as increasing moldability of the resin composition.

The cellulose ester compound (A) includes, for example, cellulose acetate (cellulose monoacetate, cellulose diacetate (DAC), cellulose triacetate), cellulose acetate propionate (CAP) and cellulose acetate butyrate (CAB).

The cellulose ester compounds (A) may be used one kind alone or may be used two or more kinds in combination.

Among these, as the cellulose ester compound (A), cellulose acetate propionate (CAP) and cellulose acetate butyrate (CAB) are preferred, and cellulose acetate propionate (CAP) is more preferred from the standpoint of suppressing the decrease in transparency and increasing the tensile strain at break of the resin molded article obtained as well as increasing moldability of the resin composition.

The weight average polymerization degree of the cellulose ester compound (A) is preferably 200 or more and 1,000 or less, and more preferably 500 or more and 1,000 or less from the standpoint of suppressing the decrease in transparency and increasing the tensile strain at break of the resin molded article obtained as well as increasing moldability of the resin composition.

Here, the weight average polymerization degree is determined according to the procedure described below using a weight average molecular weight (Mw).

First, a weight average molecular weight (Mw) of the cellulose ester compound (A) is determined by measuring with a gel permeation chromatography apparatus (GPC apparatus: HLC-8320GPC manufactured by Tosoh Corp., column: TSKgel α-M) using tetrahydrofuran and calculating in terms of polystyrene.

Subsequently, the value for weight average molecular weight is divided by a constituting unit molecular weight of the cellulose ester compound (A) to determine the weight average polymerization degree of the cellulose ester compound (A). In addition, for example, in the case wherein the substituent of the cellulose acylate is an acetyl group, the constituting unit molecular weight is 263 when the substitution degree is 2.4, and it is 284 when the substitution degree is 2.9.

The substitution degree of the cellulose ester compound (A) is preferably 2.1 or more and 2.8 or less, more preferably 2.2 or more and 2.8 or less, still more preferably 2.3 or more and 2.75 or less, and particularly preferably 2.35 or more and 2.75 or less from the standpoint of suppressing the decrease in transparency and increasing the tensile strain at break of the resin molded article obtained as well as increasing moldability of the resin composition.

In addition, in cellulose acetate propionate (CAP), a ratio (acetyl group/propionyl group) of substitution degree of an acetyl group and a propionyl group is preferably 5/1 or more and 1/20 or less, and more preferably 3/1 or more and 1/15 or less from the standpoint of suppressing the decrease in transparency and increasing the tensile strain at break of the resin molded article obtained as well as increasing moldability of the resin composition.

In cellulose acetate butyrate (CAB), a ratio (acetyl group/butyryl group) of substitution degree of an acetyl group and a butyryl group is preferably 5/1 or more and 1/20 or less, and more preferably 4/1 or more and 1/15 or less from the standpoint of suppressing the decrease in transparency and increasing the tensile strain at break of the resin molded article obtained as well as increasing moldability of the resin composition.

Here, the substitution degree is an index for expressing a degree of substation of hydroxy group of cellulose with an acyl group. In other words, the substitution degree is an index for expressing a degree of acylation of the cellulose ester compound (A). Specifically, the substitution degree means an intramolecular average value of a substitution number of three hydroxy groups in D-glucopyranose unit of cellulose acylate with an acyl group.

The substitution degree is determined from a ratio of a peak integral of a cellulose-derived hydrogen to a peak integral of an acyl group-derived hydrogen with $H^1$-NMR (JMN-ECA manufactured by JEOL RESONANCE Inc.).

[Poly(Meth)Acrylate Compound (B): Component (B)]

The poly(meth)acrylate compound (B) is a compound (resin) containing 50% by weight or more of a constituting unit derived from a (meth)acrylic acid alkyl ester. The poly(meth)acrylate compound (B) may be a compound (resin) having a constituting unit derived from a monomer other than the (meth)acrylic acid ester.

In addition, the constituting unit (unit derived from a monomer) in the poly(meth)acrylate compound (B) may be one kind alone or two or more kinds.

In the poly(meth)acrylate compound (B), the content of the constituting unit derived from a (meth)acrylic acid alkyl ester is preferably 70% by weight or more, more preferably 90% by weight or more, still more preferably 100% by weight from the standpoint of suppressing the decrease in transparency, increasing the tensile elastic modulus and increasing the tensile strain at break of the resin molded article obtained.

In the poly(meth)acrylate compound (B), the (meth)acrylic acid alkyl ester includes, for example, methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, isopropyl (meth)acrylate, isobutyl (meth)acrylate, tert-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, octyl (meth)acrylate, decyl (meth)acrylate, cyclohexyl (meth)acrylate and dicyclopentanyl (meth)acrylate.

Among these, the (meth)acrylic acid alkyl ester is suitably a (meth)acrylic acid alkyl ester having an alkyl chain with 1 or more and 8 or less (preferably 1 or more and 4 or less, more preferably 1 or more and 2 or less, still more preferably 1) carbon atoms from the standpoint of suppressing the decrease in transparency and increasing the tensile strain at break of the resin molded article obtained.

Since as the alkyl chain of the poly(meth)acrylate compound (B) is short, the SP value thereof gets close to that of the polyester resin (C), the compatibility between the poly(meth)acrylate compound (C) and the polyester resin (C) is increased to achieve improvement in haze.

In other words, the poly(meth)acrylate compound (B) is suitably a polymer containing 50% by weight or more (preferably 70% by weight or more, more preferably 90% by weight or more, still more preferably 100% by weight) of a constituting unit derived from a (meth)acrylic acid alkyl ester having an alkyl chain with 1 or more and 8 or less (preferably 1 or more and 4 or less, more preferably 1 or more and 2 or less, still more preferably 1) carbon atoms.

The poly(meth)acrylate compound (B) is suitably a polymer containing 100% by weight of constituting unit derived from a (meth)acrylic acid alkyl ester having an alkyl chain with 1 or more and 8 or less (preferably 1 or more and 4 or less, more preferably 1 or more and 2 or less, still more preferably 1) carbon atoms. That is, the poly(meth)acrylate compound (B) is suitably a poly(meth)acrylic acid alkyl ester having an alkyl chain with 1 or more and 8 or less (preferably 1 or more and 4 or less, more preferably 1 or more and 2 or less, still more preferably 1) carbon atoms.

In addition, a poly(meth)acrylic acid alkyl ester having an alkyl chain with 1 carbon atom is preferably polymethyl methacrylate.

In addition, the monomer other than the (meth)acrylic acid ester in the poly(meth)acrylate compound (B) includes, for example, a styrene [a monomer having a styrene skeleton, for example, styrene, an alkyl substituted styrene (for example, α-methylstyrene, 2-methylstyrene, 3-methylstyrene, 4-methylstyrene, 2-ethylstyrene, 3-ethylstyrene or 4-ethylstyrene), a halogenated styrene (for example, 2-chlorostyrene, 3-chlorostyrene or 4-chlorostyrene), a vinylnaphthalene (for example, 2-vinylnaphthalene) or a hydroxystyrene (for example, 4-ethenylphenol)], and an unsaturated dicarboxylic acid anhydride [a monomer having an unsaturated dicarboxylic acid anhydride skeleton, for example, maleic anhydride, itaconic anhydride, glutaconic anhydride, citraconic anhydride or aconic anhydride].

The weight average molecular weight (Mw) of the poly(meth)acrylate compound (B) is not particularly limited, and is suitably 15,000 or more and 120,000 or less (preferably more than 20,000 and 100,000 or less, more preferably 22,000 or more and 100,000 or less, still more preferably 25,000 or more and 100,000 or less).

In particular, from the standpoint of suppressing the decrease in transparency and increasing the tensile strain at break of the resin molded article obtained, the weight average molecular weight (Mw) of the poly(meth)acrylate compound (B) is preferably less than 50,000, more preferably 40,000 or less, and still more preferably 35,000 or less. However, the weight average molecular weight (Mw) of the poly(meth)acrylate compound (B) is suitably 15,000 or more.

The weight average molecular weight (Mw) of the polymethyl methacrylate is a value measured by gel permeation chromatography (GPC). Specifically, the measurement of molecular weight by GPC is performed using as a measurement apparatus, HLC-8320GPC manufactured by Tosoh Corp., as a column, TSKgel α-M manufactured by Tosoh Corp., and as a solvent, tetrahydrofuran. Then, the weight average molecular weight (Mw) is calculated from the measurement result by using a molecular weight calibration curve prepared using a monodisperse polystyrene standard sample.

[Polyester Resin (C): Component (C)]

The polyester resin (C) includes, for example, a polymer of a hydroxyalkanoate (hydroxyalkanoic acid), a polycondensate of a polyvalent carboxylic acid and a polyhydric alcohol, and a ring-opening polycondensate of a cyclic lactam.

As the polyester resin (C), an aliphatic polyester resin is suitable. The aliphatic polyester resin includes, for example, a polyhydroxyalkanoate (polymer of hydroxyalkanoate) and a polycondensate of an aliphatic diol and an aliphatic carboxylic acid.

Among these, as the polyester resin (C), a polyhydroxyalkanoate is preferred from the standpoint of suppressing the decrease in transparency and increasing the tensile strain at break of the resin molded article obtained.

The polyhydroxyalkanoate includes, for example, a compound having a structural unit represented by formula (PHA).

In the compound having a structural unit represented by formula (PHA), as to terminals of a polymer chain (terminals of a main chain), both terminals may be carboxyl groups or only one terminal may be a carboxylic group and the other terminal may be other group (for example, a hydroxy group).

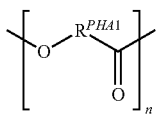

Formula (PHA)

In formula (PHA), $R^{PHA1}$ represents an alkylene group having 1 or more and 10 or less carbon atoms. n represents an integer of 2 or more.

In formula (PHA), the alkylene group represented by $R^{PHA1}$ is preferably an alkylene group having 3 or more and 6 or less carbon atoms. The alkylene group represented by $R^{PHA1}$ may have any of a straight-chain and branched form, and preferably has a branched form.

Here, the term "$R^{PHA1}$ in formula (PHA) represents an alkylene group" indicates (1) that formula (PHA) includes the same [O—$R^{PHA1}$—C(=O)—] structure in which $R^{PHA1}$ represents the same alkylene group or (2) that formula (PHA) includes a plurality of [O—$R^{PHA1}$—C(=O)—] structures (that is, [O—$R^{PHA1A}$—C(=O)—] [O—$R^{PHA1}B$—C(=O)—] structures) in which $R^{PHA1}$ represents a different alkylene group ($R^{PHA1}$ represents an alkylene group different in the number of carbon atoms or the branched state).

In other words, the polyhydroxyalkanoate may be a homopolymer composed of one kind of hydroxyalkanoate (hydroxyalkanoic acid) or may be a copolymer composed of two or more kinds of hydroxyalkanoates (hydroxyalkanoic acids).

In formula (PHA), the upper limit of n is not particularly limited, and is, for example, 20,000 or less. The range of n is preferably 500 or more and 10,000 or less, and more preferably 1,000 or more and 8,000 or less.

The polyhydroxyalkanoate includes, for example, a homopolymer of a hydroxyalkanoic acid (for example, lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxyhexanoic acid, 2-hydroxyisohexanoic acid, 6-hydroxyhexanoic acid, 3-hydroxypropionic acid, 3-hydroxy-2,2-dimethylpropionic acid, 3-hydroxyhexanoic acid or 2-hydroxy-n-octanoic acid) and a copolymer of two or more kinds of the hydroxyalkanoic acids.

Among these, the polyhydroxyalkanoate is preferably a homopolymer of a branched hydroxyalkanoic acid having 2 or more and 4 or less carbon atoms or a single copolymer of only a branched hydroxyalkanoic acid having 2 or more and 4 or less carbon atoms and a branched hydroxyalkanoic acid having 5 or more and 7 or more carbon atoms, more preferably a homopolymer of a branched hydroxyalkanoic acid having 3 carbon atoms (in other words, polylactic acid) or a single copolymer of only 3-hydrobutyric acid and 3-hydroxyhexanoic acid (in other words, polyhydroxybutyrate-hexanoate), and still more preferably a homopolymer of a branched hydroxyalkanoic acid having 3 carbon atoms (in other words, polylactic acid) from the standpoint of suppressing the decrease in transparency and increasing the tensile strain at break of the resin molded article obtained.

The number of carbon atoms of the hydroxyalkanoic acid is a number containing the carbon atom of the carboxyl group.

The polylactic acid includes, for example, poly(L-lactic acid) in which L-lactic acid is the constituting unit, poly(D-lactic acid) in which D-lactic acid is the constituting unit, poly(DL-lactic acid) in which L-lactic acid and D-lactic acid are the constituting units, and a mixture thereof. Other monomers excluding the lactic acid may be copolymerized with at least one of L-lactic acid and D-lactic acid.

A polymerization method for the polylactic acid is not particularly limited, and the polylactic acid may be that polymerized by any of known methods, for example, a condensation polymerization method or a ring-opening polymerization method. For example, in the case of using the condensation polymerization method, the polylactic acid is that constructed in an arbitrary composition by direct dehydration condensation polymerization of L-lactic acid, D-lactic acid or a mixture thereof. Further, in the case of using the ring-opening polymerization method, the polylactic acid resin is a polylactic acid constructed in an arbitrary composition by mixing a lactide which is a cyclic dimer of lactic acid with a polymerization regulator and the like, if desired, and polymerizing using a catalyst. The lactide described above includes L-lactide which is a dimer of L-lactic acid, D-lactide which is a dimer of D-lactic acid, and DL-lactide which is composed of L-lactic acid and D-lactic acid.

In the polyhydroxybutyrate-hexanoate, a copolymerization ratio of 3-hydroxyhexanoic acid (3-hydroxyhexanoate) with respect to the copolymer of 3-hydroxybutyric acid (3-hydroxybutyrate) and 3-hydroxyhexanoic acid (3-hydroxyhexanoate) is preferably 3% by mole or more and 20% by mole or less, more preferably 4% by mole or more and 15% by mole or less, and still more preferably 5% by mole or more and 12% by mole or less from the standpoint of suppressing the decrease in transparency and increasing the tensile strain at break of the resin molded article obtained.

In addition, as to a measurement method of the copolymerization ratio of 3-hydroxyhexanoic acid (3-hydroxyhexanoate), a hexanoate ratio is determined from values of peak integrals derived from a hexanoate terminal and a butyrate terminal with $H^1$-NMR.

The weight average molecular weight (Mw) of the polyester resin (C) is suitably 10,000 or more and 1,000,000 or less (preferably 50,000 or more and 800,000 or less, more preferably 100,000 or more and 600,000 or less) from the standpoint of suppressing the decrease in transparency and increasing the tensile strain at break of the resin molded article obtained.

The weight average molecular weight (Mw) of the polyester resin (C) is a value measured by gel permeation chromatography (GPC). Specifically, the measurement of molecular weight by GPC is performed using as a measurement apparatus, HPLC1100 manufactured by Tosoh Corp., as columns, TSKgel GMHHR-M+TSKgel GMHHR-M (7.8 mm I.D. 30 cm) manufactured by Tosoh Corp., and as a solvent, chloroform. Then, the weight average molecular weight (Mw) is calculated from the measurement result by using a molecular weight calibration curve prepared using a monodisperse polystyrene standard sample.

[Polymer (D); Component (D)]

The polymer (D) is at least one polymer selected from a polymer with a core shell structure having a core layer and a shell layer containing a polymer of a (meth)acrylic acid alkyl ester on a surface of the core layer, and an olefin polymer which is a polymer of an α-olefin and a (meth)acrylic acid alkyl ester and contains 60% by weight or more of a constituting unit derived from the α-olefin.

The polymer (D) is suitably one (thermoplastic elastomer) having elasticity at normal temperature (25° C.) and having a property of softening at high temperature similar to a thermoplastic resin.

(Polymer with Core Shell Structure)

The polymer with a core shell structure according to the exemplary embodiment is a polymer with a core shell structure having a core layer and a shell layer on a surface of the core layer.

The polymer with a core shell structure is a polymer having the core layer as the innermost layer and the shell layer as the outermost layer (specifically, a polymer in which with a polymer for forming the core layer is graft-polymerized a polymer of a (meth)acrylic acid alkyl ester to form the shell layer).

In addition, between the core layer and the shell layer, one or more other layers (for example, one or more and 6 or less other layers) may be present. In the case wherein the other layers are present, the polymer with a core shell structure is a polymer in which with a polymer for forming the core layer are graft-polymerized plural kinds of polymers to form multilayers.

The core layer is not particularly limited and is preferably a rubber layer. The rubber layer includes a layer, for example, of a polymer rubber, for example, (meth)acryl rubber, silicone rubber, styrene rubber, conjugated diene rubber, α-olefin rubber, nitrile rubber, urethane rubber, polyester rubber or polyamide rubber, and of a copolymer rubber of two or more kinds of these rubber.

Among these, the rubber layer is preferably a layer, for example, of a polymer rubber, for example, (meth)acryl rubber, silicone rubber, styrene rubber, conjugated diene rubber or α-olefin rubber, or of a copolymer rubber of two or more kinds of these rubber.

In addition, the rubber layer may be a rubber layer crosslinked by copolymerization with a crosslinking agent (for example, divinylbenzene, allyl acrylate or butylene glycol diacrylate).

The (meth)acryl rubber includes, for example, a polymer rubber obtained by polymerizing a (meth)acrylic component (for example, an alkyl (having 2 or more and 6 or less carbon atoms) ester of (meth)acrylic acid).

The silicone rubber includes, for example, rubber constructed by a silicone component (for example, polydimethylsiloxane or polyphenylsiloxane).

The styrene rubber includes, for example, a polymer rubber obtained by polymerizing a styrene component (for example, styrene or α-styrene).

The conjugated diene rubber includes, for example, a polymer rubber obtained by polymerizing a conjugated diene component (for example, butadiene or isoprene).

The α-olefin rubber includes, for example, a polymer rubber obtained by polymerizing an α-olefin component (for example, ethylene, propylene or 2-methylpropylene).

The copolymer rubber includes, for example, a copolymer rubber obtained by polymerizing two or more kinds of (meth)acrylic components, a copolymer rubber obtained by polymerizing a (meth)acrylic component and a silicone component and a copolymer rubber obtained by polymerizing a (meth)acrylic component, a conjugated diene component and a styrene component.

In the polymer of a (meth)acrylic acid alkyl ester contained in the shell, the (meth)acrylic acid alkyl ester includes, for example, methyl (meth)acrylate, ethyl (meth)acrylate, n-propyl (meth)acrylate, n-butyl (meth)acrylate, tert-butyl (meth)acrylate, n-hexyl (meth)acrylate, 2-ethylhexyl (meth)acrylate, cyclohexyl (meth)acrylate, stearyl (meth)acrylate and octadecyl (meth)acrylate. In the (meth)acrylic acid alkyl ester, at least a part of hydrogen atoms of the alkyl chain may be substituted. The substituent includes, for example, an amino group, a hydroxy group and a halogen atom.

Among these, as the polymer of a (meth)acrylic acid alkyl ester, a polymer of a (meth)acrylic acid alkyl ester having an alkyl chain with 1 or more and 8 or less carbon atoms is preferred, a polymer of a (meth)acrylic acid alkyl ester having an alkyl chain with 1 or more and 2 or less carbon atoms is more preferred, and a polymer of a (meth)acrylic acid alkyl ester having an alkyl chain with 1 carbon atom is still more preferred from the standpoint of suppressing the decrease in transparency and increasing the tensile strain at break of the resin molded article obtained. In particular, a copolymer of two or more acrylic acid alkyl esters different in the number of carbon atoms in the alkyl chain is preferred.

The content of the polymer of the shell layer in the polymer with a core shell structure is preferably 1% by weight or more and 40% by weight or less, more preferably 3% by weight or more and 30% by weight or less, and still more preferably 5% by weight or more and 15% by weight or less, with respect to the whole polymer with a core shell structure.

The polymer with a core shell structure according to the exemplary embodiment may be a commercially available product or may be produced by a known method.

The commercially available product includes, for example, "Metablen" manufactured by Mitsubishi Chemical Corp., "Kane Ace" manufactured by Kaneka Corp., and "Paraloid" manufactured by Dow Chemical Co. These may be used alone or two or more kinds in combination.

The known method includes an emulsion polymerization method. The production method specifically includes the following method. First, a mixture of a monomer is subjected to emulsion polymerization to from a core particle (core layer) and then a mixture of other monomer different from the monomer used for forming the core particle is subjected to emulsion polymerization in the presence of the core particle (core layer) to from a shell layer around the core particle (core layer), thereby producing a polymer with a core shell structure.

Further, in the case of forming other layer between the core layer and the shell layer, the emulsion polymerization of a mixture of other monomer is repeated to obtain a polymer with a core shell structure constructed with the desired core layer, other layer and shell layer.

The average primary particle diameter of the polymer with a core shell structure according to the exemplary embodiment is not particularly limited, and is preferably from 50 nm to 500 nm, more preferably from 50 nm to 400 nm, particularly preferably from 100 nm to 300 nm, and most preferably from 150 nm to 250 nm from the standpoint of suppressing the decrease in transparency and increasing the tensile strain at break of the resin molded article obtained.

In addition, the average primary particle diameter is a value determined by the following method. The average primary particle diameter is a number average primary particle diameter which is an average of primary particle diameters over 100 particles. Each of the primary particle diameters is the maximum diameter in each primary particle and measured by observing the particles with a scanning electron microscope. Specifically, it is determined by observing the dispersion state of the polymer with a core shell structure in the resin composition by a scanning electron microscope.

(Olefin Polymer)

An α-olefin contained, as the constituting unit, in the olefin polymer includes, for example, ethylene, propylene and 2-methylpropylene. From the standpoint of suppressing the decrease in transparency and increasing the tensile strain at break of the resin molded article obtained, an α-olefin having 2 or more and 8 or less carbon atoms is preferred, and an α-olefin having 2 or more and 3 or less carbon atoms is more preferred. Among these, ethylene is still more preferred.

The (meth)acrylic acid alkyl ester polymerized with the α-olefin in the olefin polymer includes, for example, methyl (meth)acrylate, ethyl (meth)acrylate, n-propyl (meth)acrylate, n-butyl (meth)acrylate, tert-butyl (meth)acrylate, n-hexyl (meth)acrylate, 2-ethylhexyl (meth)acrylate, cyclohexyl (meth)acrylate, stearyl (meth)acrylate and octadecyl (meth)acrylate. From the standpoint of suppressing the decrease in transparency and increasing the tensile strain at break of the resin molded article obtained, a (meth)acrylic acid alkyl ester having an alkyl chain with 1 or more and 8 or less carbon atoms is preferred, a (meth)acrylic acid alkyl ester having an alkyl chain with 1 or more and 4 or less carbon atoms is more preferred, and a (meth)acrylic acid alkyl ester having an alkyl chain with 1 or more and 2 or less carbon atoms is still more preferred.

In particular, the olefin polymer is preferably a polymer of ethylene and methyl acrylate from the standpoint of suppressing the decrease in transparency and increasing the tensile strain at break of the resin molded article obtained.

The olefin polymer is a polymer of an α-olefin and a (meth)acrylic acid alkyl ester and contains 60% by weight or more of a constituting unit derived from the α-olefin. From the standpoint of suppressing the decrease in transparency and increasing the tensile strain at break of the resin molded article obtained, it is preferred to contain 60% by weight or more and 97% by weight or less of the constituting unit derived from the α-olefin, and it is more preferred to contain 70% by weight or more and 85% by weight or less of the constituting unit derived from the α-olefin.

The olefin polymer may contain other constituting unit excluding the constituting unit derived from the α-olefin and the constituting unit derived from the (meth)acrylic acid alkyl ester.

However, the content of other constituting units is suitably 10% by weight or less with respect to the total constituting units in the olefin polymer.

[Content or Weight Ratio of Component (A) to Component (D)]

The content or weight ratio of each component will be described. The content or weight ratio of each component is preferably in the range described below from the standpoint of suppressing the decrease in transparency and increasing the tensile strain at break of the resin molded article obtained. The abbreviation of each component is as follows.

Component (A): Cellulose ester compound (A)
Component (B): Poly(meth)acrylate compound (B)
Component (C): Polyester resin (C)
Component (D): At least one polymer (D) selected from a polymer with a core shell structure and an olefin polymer A weight ratio (A)/((A)+(B)+(C)+(D)) of Component (A) with respect to the total of Component (A), Component (B), Component (C) and Component (D) is preferably 0.5 or more and 0.93 or less, more preferably 0.66 or more and 0.89 or less, and still more preferably 0.74 or more and 0.85 or less.

A weight ratio (B)/((A)+(B)+(C)+(D)) of Component (B) with respect to the total of Component (A), Component (B), Component (C) and Component (D) is preferably 0.01 or more and 0.25 or less, more preferably 0.015 or more and 0.19 or less, and still more preferably 0.025 or more and 0.14 or less.

A weight ratio (C)/((A)+(B)+(C)+(D)) of Component (C) with respect to the total of Component (A), Component (B), Component (C) and Component (D) is preferably 0.01 or more and 0.25 or less, more preferably 0.015 or more and 0.19 or less, and still more preferably 0.025 or more and 0.14 or less.

A weight ratio (D)/((A)+(B)+(C)+(D)) of Component (D) with respect to the total of Component (A), Component (B), Component (C) and Component (D) is preferably 0.006 or more and 0.22 or less, more preferably 0.038 or more and 0.17 or less, and still more preferably 0.07 or more and 0.155 or less.

A weight ratio (B)+(C)/(A) of the total of Component (B) and Component (C) with respect to Component (A) is preferably 0.05 or more and 1 or less, more preferably 0.75 or more and 0.5 or less, and still more preferably 0.1 or more and 0.3 or less.

When the weight ratio described above is less than 0.05, the tensile elastic modulus of the resin molded article obtained is apt to decrease.

A weight ratio (C)/((B)+(C)) of Component (C) with respect to the total of Component (B) and Component (C) is preferably 0.3 or more and 0.7 or less, more preferably 0.35 or more and 0.65 or less, and still more preferably 0.4 or more and 0.6 or less.

A weight ratio (D)/((A)+(B)+(C)) of Component (D) with respect to the total of Component (A), Component (B) and Component (C) is preferably 0.03 or more and 0.3 or less, more preferably 0.05 or more and 0.2 or less, and still more preferably 0.07 or more and 0.15 or less.

When the weight ratio described above exceeds 0.3, the tensile elastic modulus of the resin molded article obtained is apt to decrease.

The content of Component (A) with respect to the rein composition is preferably 50% by weight or more, more preferably 60% by weight or more, and still more preferably 70% by weight or more from the standpoint of increasing the tensile strain at break of the resin molded article obtained.

(Other Components)

The resin composition according to the exemplary embodiment may contain other components. Other components include, for example, a plasticizer, a flame retardant, a compatibilizer, an antioxidant, a release agent, a light resistant agent, a weather resistant agent, a colorant, a pigment, a modifier, a drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride and the like).

Further, if desired, a component (additive), for example, an acid acceptor for preventing acetic acid release or a reactive trapping agent may be added. The acid acceptor includes, for example, an oxide, for example, magnesium oxide or aluminum oxide; a metal hydroxide, for example, magnesium hydroxide, calcium hydroxide, aluminum hydroxide or hydrotalcite; calcium carbonate; and talc.

The reactive trapping agent include, for example, an epoxy compound, an acid anhydride compound and a carbodiimide.

The content of the respective components is preferably 0% by weight or more and 5% by weight or less with respect to the total amount of the resin composition. Here, the expression "0% by weight" means that other components are not included in the resin composition.

As the other component, it is preferred to blend a plasticizer. The plasticizer is not particularly limited as far as it is known and includes, for example, an adipic acid ester-containing compound, a polyether ester compound, a sebacic acid ester compound, a glycol ester compound, an acetic acid ester, a dibasic acid ester compound, a phosphoric acid ester compound, a phthalic acid ester compound, camphor, a citric acid ester, a stearic acid ester, metallic soap, a polyol and a polyalkylene oxide.

Among these, an adipic acid ester-containing compound and a polyether ester compound are preferred, and an adipic acid ester-containing compound is more preferred.

The adipic acid ester-containing compound (compound containing an adipic acid ester) refers to a compound of an adipic acid ester alone and a mixture of an adipic acid ester and a component other than the adipic acid ester (compound different from the adipic acid ester). However, the adipic acid ester-containing compound suitably contains 50% by weight or more of the adipic acid ester with respect to the total components.

The resin composition according to the exemplary embodiment may contain other resins than the resins described above (the cellulose ester compound (A), the poly(meth)acrylate compound (B), the polyester resin (C) and the polymer (D)). However, in the case of containing other resins, the content of the other resins with respect to the total amount of the resin composition is suitably 5% by weight or less, and preferably less than 1% by weight. It is more preferred that other resins are not contained in the resin composition (that is, 0% by weight).

Other resins include, for example, conventionally known thermoplastic resins, and specifically include, for example, a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; a polyetherimide resin; a polyacetal resin; a polyvinyl acetal resin; a polyketone resin; a polyetherketone resin; a polyetheretherketone resin; a polyarylketone resin; a polyethemitrile resin; a liquid crystal resin; a polybenzimidazole resin; a polyparabanic acid resin; a vinyl polymer or a vinyl copolymer obtained by polymerizing or copolymerizing one or more vinyl monomers selected from the group consisting of an aromatic alkenyl compound, a methacrylic acid ester, an acrylic acid ester and a vinyl cyanide compound; a diene-aromatic alkenyl compound copolymer; a vinyl cyanide-diene-aromatic alkenyl compound copolymer; an aromatic alkenyl compound-diene-vinyl cyanide-N-phenylmaleimide copolymer; a vinyl cyanide-(ethylene-diene-propylene (EPDM))-aromatic alkenyl compound copolymer; a vinyl chloride resin; and a chlorinated vinyl chloride resin. These resins may be used one kind alone or may be used two or more kinds in combination.

[Method of Producing Resin Composition]

The resin composition according to the exemplary embodiment includes, for example, a step of preparing a resin composition containing the cellulose ester compound (A), the poly(meth)acrylate compound (B), the polyester resin (C) and at least one polymer (D) selected from a polymer with a core shell structure having a core layer and a shell layer containing a polymer of a (meth)acrylic acid alkyl ester on a surface of the core layer, and an olefin polymer which is a polymer of an α-olefin and a (meth)acrylic acid alkyl ester and contains 60% by weight or more of a constituting unit derived from the α-olefin.

The resin composition according to the exemplary embodiment is produced by melting and kneading a mixture containing the cellulose ester compound (A), the poly(meth)acrylate compound (B), the polyester resin (C) and at least one polymer (D) selected from a polymer with a core shell structure having a core layer and a shell layer containing a polymer of a (meth)acrylic acid alkyl ester on a surface of the core layer, and an olefin polymer which is a polymer of an α-olefin and a (meth)acrylic acid alkyl ester and contains 60% by weight or more of a constituting unit derived from the α-olefin, and, if desired, other components and the like. In addition, the resin composition according to the exemplary embodiment is produced, for example, by dissolving the components described above in a solvent.

A melting and kneading means includes known means and specifically includes, for example, a twin screw extruder, a Henschel mixer, a Banbury mixer, a single screw extruder, a multi-screw extruder and a co-kneader.

<Resin Molded Article>

The resin molded article according to the exemplary embodiment contains the resin composition according to the exemplary embodiment. That is, the resin molded article according to the exemplary embodiment is composed of the same composition as the resin composition according to the exemplary embodiment.

As the method of molding the resin molded article according to the exemplary embodiment, injection molding is preferred from the standpoint of high degree of freedom in shape. From this point of view, the resin molded article is preferably a resin molded article obtained by injection molding.

The cylinder temperature of the injection molding is, for example, 160° C. or more and 280° C. or less, and preferably 180° C. or more and 240° C. or less. The mold temperature of the injection molding is, for example, 40° C. or more and 90° C. or less, and more preferably 60° C. or more and 80° C. or less.

The injection molding may be performed, for example, by using a commercially available apparatus, for example, NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., PNX40 manufactured by Nissei Plastic Industrial Co., Ltd. and SE50D manufactured by Sumitomo Heavy Industries, Ltd.

The molding method for obtaining the resin molded article according to the exemplary embodiment is not limited to the injection molding described above and, for example, extrusion molding, blow molding, heat press molding, calendaring molding, coating molding, cast molding, dipping molding, vacuum molding and transfer molding may be applied.

In the resin molded article according to the exemplary embodiment, when the resin molded article has a thickness of 2 mm, a Haze value is suitably 10% or less (preferably 7% or less). When the haze value of the resin molded article in case of having a thickness of 2 mm is 10% or less, it is said that the resin molded article has transparency.

In addition, although the ideal value of the Haze value of the resin molded article is 0%, the Haze value is suitably 0.5% or more from the standpoint of production.

The Haze value of the resin molded article is a value measured by the method shown in the examples.

The resin molded article according to the exemplary embodiment is preferably used for the purposes of electric and electronic apparatuses, business apparatuses, home appliances, automobile interior materials, toys, containers and the like. More specifically, the resin molded article is used in housings of electric and electronic apparatuses or home appliances; various components of electric and electronic apparatuses or home appliances; interior components of automobiles; building block toys; plastic model kits; storage cases of CD-ROM, DVD and the like; tableware; drink bottles; food trays; wrapping materials; films; sheets and the like.

EXAMPLES

The invention will be described more specifically with reference to the examples, but the invention should not be construed as being limited the examples. In addition, unless otherwise noted, "part" refers to "part by weight".
<Preparation of Each Material>
The following materials are prepared.
(Preparation of Cellulose ester compound (A))
CE1: CAP-482-20 (Eastman Chemical Co.)
CE2: CAB-171-15 (Eastman Chemical Co.)
CE3: CAB-381-20 (Eastman Chemical Co.)
CE4: CAB-500-5 (Eastman Chemical Co.)
CE5: L-50 (Daicel Corp.), DAC
The characteristics of the cellulose ester compound (A) are shown as a list in Table 1. In Table 1, DPw shows the weight average polymerization degree. Further, DS(Ac), DS(Pr) and DS(Bt) show the substitution degree of acetyl group, the substitution degree of propionyl group and the substitution degree of butyryl group, respectively.

TABLE 1

| Cellulose Ester Compound (A) | DPw | DS(Ac) | DS(Pr) | DS(Bt) |
|---|---|---|---|---|
| CE1 | 716 | 0.18 | 2.49 | — |
| CE2 | 754 | 2.07 | — | 0.73 |
| CE3 | 890 | 1.05 | — | 1.74 |
| CE4 | 625 | 0.17 | — | 2.64 |
| CE5 | 570 | 2.45 | — | — |

(Preparation of Poly(meth)acrylate compound (B))
B1: Delpowder 500V (Asahi Kasei Chemicals Corp.), polymethyl methacrylate (PMMA), MW in terms of PS=25,000
B2: Sumipex MHF (Sumitomo Chemical Co., Ltd.), polymethyl methacrylate (PMMA), MW=95,000
B3: Delpet 980N (Asahi Kasei Chemicals Corp.), single copolymer of methyl methacrylate (MMA), styrene (St) and maleic anhydride (MAH) (weight ratio=MMA:St:MAH=67:14:19), Mw=110,000
B4: TX-100S (Denka Co., Ltd.), single copolymer of methyl methacrylate (MMA) and styrene (St) (weight ratio=MMA:St=61:40), Mw=105,000
B5: Single copolymer of methyl methacrylate (MMA) and styrene (St) (weight ratio=MMA:St=30:70), Mw=77,000
B6: Single copolymer of methyl acrylate (MA) and styrene (St) (weight ratio=MA:St=65:35), Mw=72,000
B7: Polyethyl methacrylate, MW=55,000
(Preparation of Polyester Resin (C))
C1: Ingeo Biopolymer 3001D (NatureWorks LLC), polylactic acid (PLA)
C2: Aonilex X151A (Kaneka Corp.), single copolymer of 3-hydroxybutyric acid (3-hydroxybutyrate) and 3-hydroxyhexanoic acid (3-hydroxyhexanoate) (PHBH)
(Preparation of Polymer (D))
D1: Metablen W-600A (Mitsubishi Chemical Corp.), polymer with a core shell structure (polymer obtained by graft polymerization of a homopolymer rubber of methyl methacrylate to a single copolymer rubber of 2-ethylhexyl acrylate and n-butyl acrylate for forming a core layer, thereby forming a shell layer), average primary particle diameter=200 nm
D2: Metablen C-223A (Mitsubishi Chemical Corp.), polymer with a core shell structure (polymer (MSB) obtained by graft polymerization of a single copolymer of methyl methacrylate and styrene to a homopolymer rubber of butadiene for forming a core layer, thereby forming a shell layer), average primary particle diameter=300 nm
D3: Metablen S-2006 (Mitsubishi Chemical Corp.), polymer with a core shell structure (polymer obtained by graft polymerization of an alkyl methacrylate to a polymer rubber layer containing polysiloxane as a polymerization component for forming a core layer, thereby forming a shell layer), average primary particle diameter=200 nm
D4: Lotryl 29MA03 (Arkema S.A.), block copolymer of ethylene and methyl acrylate, weight ratio of ethylene and methyl acrylate=71:29
D5: Block copolymer of propylene and methyl acrylate, weight ratio of propylene and methyl acrylate=65:35
D6: JSR TR 2500 (JSR Corp.), block copolymer of styrene, butadiene and styrene (SBS)
D7: AR-SC-0 (Aronkasei Co., Ltd.), block copolymer of hydrogenated styrene, butadiene and styrene (SEBS)
(Preparation of Other Components)
PL1: Daifatty 101 (Daihachi Chemical Industry Co., Ltd.), adipic acid ester-containing compound, plasticizer Examples 1 to 33 and Comparative Examples 1 to 5

(Kneading and Injection Molding)
Kneading is performed using a twin screw kneading apparatus (LTE20-44 manufactured by Labtech Engineering Co., Ltd.) in the charging composition ratio shown in Table 2 and at the cylinder temperature shown in Table 2 to obtain a resin composition (pellet).
Resin molded articles (1) to (2) shown below are molded from the pellets obtained by using an injection molding machine (NEX5001 manufactured by Nissei Plastic Industrial Co., Ltd.) at the cylinder temperature shown in Table 2 and at the mold temperature of 60° C., at which the injection peak pressure does not exceed 180 MPa.
(1): ISO multi-purpose dumbbell test piece (measurement part size: width of 10 mm/thickness of 4 mm)
(2): D12 small square plate (size: 60 mm×60 mm/thickness of 2 mm)
<Evaluation>
As to the molded articles obtained, the evaluations shown below are performed. The evaluation results are shown in Table 2.
(Tensile Strain at Break)
Using the ISO multi-purpose dumbbell test piece obtained, measurement of the tensile strain at break is performed using a universal tester (AUTOGRAPH AG-Xplus manufactured by Shimadzu Corp.) by the method in accordance with ISO 527.
(Tensile Elastic Modulus)
Using the ISO multi-purpose dumbbell test piece obtained, measurement of the tensile elastic modulus is performed using a universal tester (AUTOGRAPH AG-Xplus manufactured by Shimadzu Corp.) by the method in accordance with ISO 527.
(Haze Value)
As to the D12 small square plate, the haze value is measured using a haze meter (NDH 200 manufactured by Nippon Denshoku Industries Co., Ltd.).

TABLE 2

| | Cellulose Ester Compound (A) | Poly(meth)acrylate Compound (B) | Polyester Resin (C) | (C)/(B)+(C) | (B+C)/(A) | Polymer (D) | (D)/(A+B+C) | Other Component | Cylinder Temperature at Kneading and Molding (° C.) | Haze (%) | Tensile Elastic Modulus (MPa) | Tensile Strain at Break (%) |
|---|---|---|---|---|---|---|---|---|---|---|---|---|
| Example 1 | CE1 = 100 | B1 = 5 | C1 = 5 | 0.5 | 0.1 | D1 = 10 | 0.09 | — | 220 | 5.4 | 1900 | 45 |
| Example 2 | CE1 = 100 | B1 = 12.5 | C1 = 12.5 | 0.5 | 0.25 | D1 = 10 | 0.08 | — | 220 | 5.6 | 2020 | 41 |
| Example 3 | CE1 = 100 | B1 = 3 | C1 = 3 | 0.5 | 0.06 | D1 = 10 | 0.09 | — | 220 | 5.5 | 1770 | 47 |
| Example 4 | CE1 = 100 | B1 = 45 | C1 = 45 | 0.5 | 0.9 | D1 = 10 | 0.05 | — | 220 | 5.7 | 2470 | 40 |
| Example 5 | CE1 = 100 | B1 = 2 | C1 = 2 | 0.5 | 0.04 | D1 = 10 | 0.1 | — | 220 | 5.4 | 1710 | 45 |
| Example 6 | CE1 = 100 | B1 = 55 | C1 = 55 | 0.5 | 1.1 | D1 = 10 | 0.05 | — | 220 | 5.6 | 2480 | 26 |
| Example 7 | CE1 = 40 | B2 = 30 | C1 = 30 | 0.5 | 1.5 | D1 = 10 | 0.1 | — | 220 | 5.9 | 2780 | 15 |
| Example 8 | CE1 = 40 | B2 = 30 | C1 = 30 | 0.5 | 1.5 | D2 = 10 | 0.1 | — | 220 | 11.5 | 2710 | 13 |
| Example 9 | CE1 = 100 | B1 = 5 | C1 = 5 | 0.5 | 0.1 | D1 = 5 | 0.05 | — | 220 | 3.6 | 2220 | 41 |
| Example 10 | CE1 = 100 | B1 = 5 | C1 = 5 | 0.5 | 0.1 | D1 = 30 | 0.27 | — | 220 | 6.1 | 1580 | 51 |
| Example 11 | CE1 = 100 | B1 = 5 | C1 = 5 | 0.5 | 0.1 | D1 = 3 | 0.027 | — | 220 | 3.1 | 2250 | 32 |
| Example 12 | CE1 = 100 | B1 = 5 | C1 = 5 | 0.5 | 0.1 | D1 = 40 | 0.36 | — | 220 | 7.5 | 1390 | 50 |
| Example 13 | CE1 = 100 | B3 = 3.5 | C1 = 6.5 | 0.65 | 0.1 | D1 = 10 | 0.09 | — | 220 | 5.5 | 1930 | 47 |
| Example 14 | CE1 = 100 | B4 = 3.5 | C1 = 6.5 | 0.65 | 0.1 | D1 = 10 | 0.09 | — | 220 | 5.9 | 1900 | 44 |
| Comparative Example 1 | CE1 = 100 | B5 = 3 | C1 = 7 | 0.7 | 0.1 | D1 = 10 | 0.09 | — | 220 | 22.1 | 1860 | 9 |
| Example 15 | CE1 = 100 | B6 = 7 | C1 = 3 | 0.3 | 0.1 | D1 = 10 | 0.09 | — | 220 | 8.5 | 1490 | 42 |
| Example 16 | CE1 = 100 | B7 = 7 | C1 = 3 | 0.3 | 0.1 | D1 = 10 | 0.09 | — | 220 | 8.6 | 1470 | 38 |
| Example 17 | CE1 = 100 | B1 = 6.5 | C1 = 3.5 | 0.35 | 0.1 | D1 = 10 | 0.09 | — | 220 | 8.5 | 1910 | 42 |
| Example 18 | CE1 = 100 | B1 = 3.5 | C1 = 6.5 | 0.65 | 0.1 | D1 = 10 | 0.09 | — | 220 | 8.3 | 1910 | 42 |
| Example 19 | CE1 = 100 | B1 = 7.5 | C1 = 2.5 | 0.25 | 0.1 | D1 = 10 | 0.09 | — | 220 | 12.1 | 1900 | 30 |
| Example 20 | CE1 = 100 | B1 = 2.5 | C1 = 7.5 | 0.75 | 0.1 | D1 = 10 | 0.09 | — | 220 | 12.2 | 1920 | 31 |
| Comparative Example 2 | CE1 = 100 | B1 = 10 | — | 0 | 0.1 | D1 = 10 | 0.09 | — | 220 | 12.6 | 1920 | 19 |
| Comparative Example 3 | CE1 = 100 | — | C1 = 10 | 1 | 0.1 | D1 = 10 | 0.09 | — | 220 | 13.0 | 1910 | 17 |
| Example 21 | CE2 = 100 | B1 = 5 | C1 = 5 | 0.5 | 0.1 | D1 = 10 | 0.09 | — | 220 | 5.5 | 2470 | 38 |
| Example 22 | CE3 = 100 | B1 = 5 | C1 = 5 | 0.5 | 0.1 | D1 = 10 | 0.09 | — | 220 | 5.7 | 2140 | 42 |
| Example 23 | CE4 = 100 | B1 = 5 | C1 = 5 | 0.5 | 0.1 | D1 = 10 | 0.09 | — | 220 | 5.3 | 1410 | 50 |
| Example 24 | CE5 = 91 | B1 = 4 | C1 = 6 | 0.6 | 0.11 | D1 = 10 | 0.1 | PL1 = 9 | 250 | 8.7 | 2920 | 22 |
| Example 25 | CE5 = 83 | B1 = 4 | C1 = 6 | 0.6 | 0.12 | D1 = 10 | 0.11 | PL1 = 17 | 230 | 7.9 | 2340 | 24 |
| Example 26 | CE1 = 100 | B1 = 5 | C2 = 5 | 0.5 | 0.1 | D1 = 10 | 0.09 | — | 220 | 6.1 | 1510 | 46 |
| Example 27 | CE1 = 100 | B2 = 5 | C1- = 5 | 0.5 | 0.1 | D1 = 10 | 0.09 | — | 220 | 6.2 | 1910 | 35 |
| Example 28 | CE1 = 100 | B2 = 6.5 | C1 = 3.5 | 0.35 | 0.1 | D1 = 10 | 0.09 | — | 220 | 11.1 | 1900 | 37 |
| Example 29 | CE1 = 100 | B2 = 3.5 | C1 = 6.5 | 0.65 | 0.1 | D1 = 10 | 0.09 | — | 220 | 11.4 | 1920 | 33 |
| Example 30 | CE1 = 100 | B1 = 5 | C1 = 5 | 0.5 | 0.1 | D2 = 10 | 0.09 | — | 220 | 10.7 | 1910 | 44 |
| Example 31 | CE1 = 100 | B1 = 5 | C1 = 5 | 0.5 | 0.1 | D3 = 10 | 0.09 | — | 220 | 7.1 | 1780 | 41 |
| Example 32 | CE1 = 100 | B1 = 5 | C1 = 5 | 0.5 | 0.1 | D4 = 10 | 0.09 | — | 220 | 6.4 | 1770 | 45 |
| Example 33 | CE1 = 100 | B1 = 5 | C1 = 5 | 0.5 | 0.1 | D5 = 10 | 0.09 | — | 220 | 10.9 | 1940 | 36 |
| Comparative Example 4 | CE1 = 100 | B1 = 5 | C1 = 5 | 0.5 | 0.1 | D6 = 10 | 0.09 | — | 220 | 62.1 | 1870 | 18 |
| Comparative Example 5 | CE1 = 100 | B1 = 5 | C1 = 5 | 0.5 | 0.1 | D7 = 10 | 0.09 | — | 220 | 59.2 | 1780 | 15 |

In Table 2, each material and each blending quantity of each composition are described in each column of the table in the form of "kind of material=number of parts by weight".

For example, in the column of Cellulose Ester Compound (A) of Example 1, the description of "CE1=100" indicates that 100 parts by weight of cellulose ester compound "CE1" is blended.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:

a cellulose ester compound (A), a poly(meth)acrylate compound (B) containing 50% by weight or more of a constituting unit derived from a (meth)acrylic acid alkyl ester, a polyester resin (C), and at least one polymer (D) selected from a polymer with a core shell structure having a core layer and a shell layer containing a polymer of a (meth)acrylic acid alkyl ester on a surface of the core layer, and an olefin polymer which is a polymer of an α-olefin and a (meth)acrylic acid alkyl ester and contains 60% by weight or more of a constituting unit derived from the α-olefin.

2. The resin composition according to claim 1, wherein the cellulose ester compound (A) is at least one selected from a cellulose acetate propionate (CAP) and a cellulose acetate butyrate (CAB).

3. The resin composition according to claim 2, wherein the cellulose ester compound (A) is the cellulose acetate propionate (CAP).

4. The resin composition according to claim 1, wherein the poly(meth)acrylate compound (B) is a poly(meth)acrylic acid alkyl ester having an alkyl chain with 1 or more and 8 or less carbon atoms.

5. The resin composition according to claim 4, wherein the poly(meth)acrylate compound (B) is a polymethyl methacrylate.

6. The resin composition according to claim 1, wherein the poly(meth)acrylate compound (B) is a poly(meth)acrylate compound having a weight average molecular weight of less than 50,000.

7. The resin composition according to claim 1, wherein the polyester resin (C) is a polyhydroxyalkanoate.

8. The resin composition according to claim 7, wherein the polyester resin (C) is a polylactic acid.

9. The resin composition according to claim 1, wherein the polymer with a core shell structure in the polymer (D) is a polymer containing, as the polymer of a (meth)acrylic acid alkyl ester, a polymer of a (meth)acrylic acid alkyl ester having an alkyl chain with 1 or more and 8 or less carbon atoms in the shell layer.

10. The resin composition according to claim 9, wherein the polymer with a core shell structure in the polymer (D) is a polymer containing, as the polymer of a (meth)acrylic acid alkyl ester, a copolymer of two or more (meth)acrylic acid alkyl esters different from one another in carbon number of alkyl chain thereof in the shell layer.

11. The resin composition according to claim 1, wherein the olefin polymer in the polymer (D) is a polymer of an α-olefin having 2 or more and 8 or less carbon atoms and a (meth)acrylic acid alkyl ester having an alkyl chain with 1 or more and 8 or less carbon atoms.

12. The resin composition according to claim 11, wherein the olefin polymer in the polymer (D) is a polymer of an ethylene and a methyl acrylate.

13. The resin composition according to claim 1, wherein a weight ratio of a total of the poly(meth)acrylate compound (B) and the polyester resin (C) with respect to the cellulose ester compound (A) is 0.05 or more and 1 or less.

14. The resin composition according to claim 13, wherein a content of the cellulose ester compound (A) with respect to the resin composition is 50% by weight or more.

15. The resin composition according to claim 1, wherein a weight ratio of the polyester resin (C) with respect to a total of the poly(meth)acrylate compound (B) and the polyester resin (C) is 0.3 or more and 0.7 or less.

16. The resin composition according to claim 1, wherein a weight ratio of the polymer (D) with respect to a total of the cellulose ester compound (A), the poly(meth)acrylate compound (B), and the polyester resin (C) is 0.03 or more and 0.3 or less.

17. A resin molded article comprising the resin composition according to claim 1.

18. The resin molded article according to claim 17, wherein a haze value of the resin molded article in case of having a thickness of 2 mm is 10% or less.

19. The resin molded article according to claim 17, which is an injection molded article.

\* \* \* \* \*